United States Patent Office 3,332,322
Patented July 25, 1967

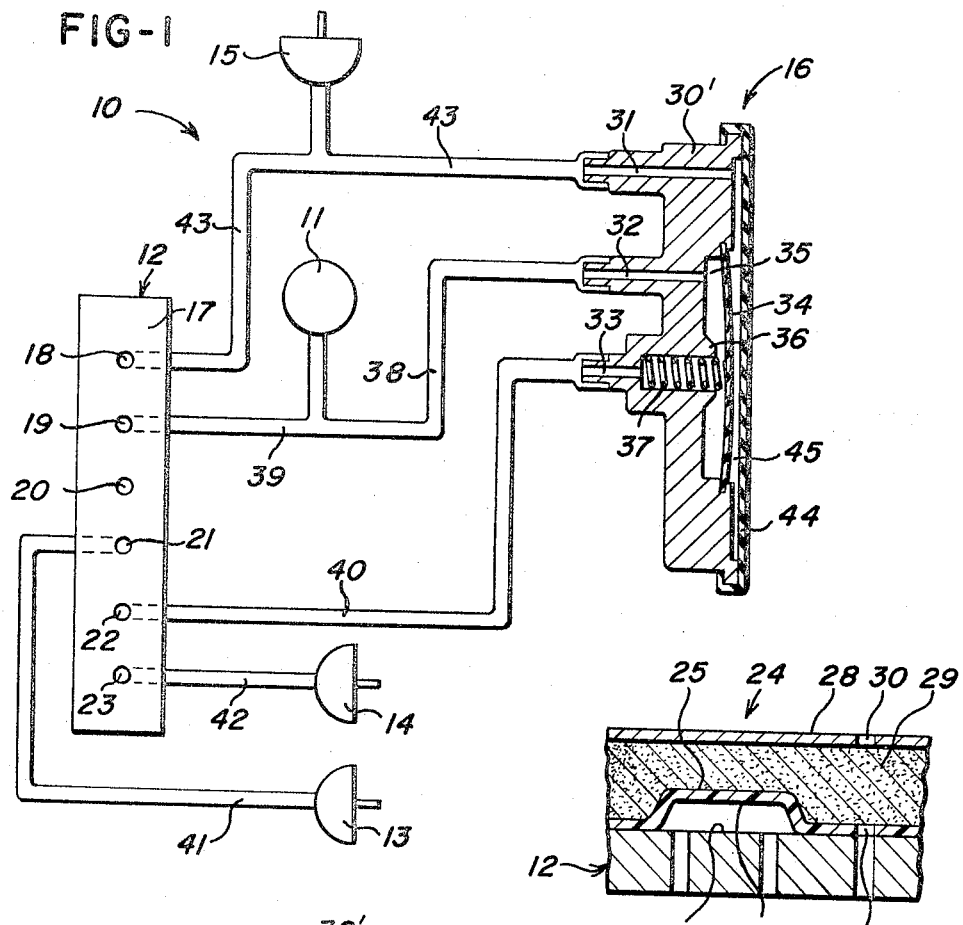
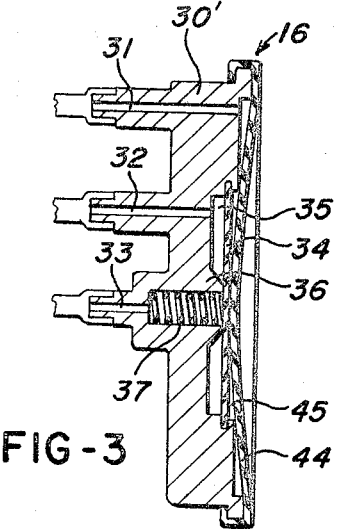

3,332,322
PNEUMATIC SYSTEM AND PARTS THEREFOR OR THE LIKE
Roland D. Beck, Anaheim, Calif., assignor to Robertshaw Controls Company, Richmond, Va., a corporation of Delaware
Filed Feb. 12, 1965, Ser. No. 432,291
20 Claims. (Cl. 91—36)

ABSTRACT OF THE DISCLOSURE

The disclosure relates to a control system for an apparatus or the like wherein pneumatic signal means are directed to various pneumatically operated actuator means by a program control member to control the operation of the actuator means in a predetermined sequence, the system including a lock-out device that prevents the signal means from being directed to certain actuator means when the program control member is rapidly moved to a particular position thereof. The lock-out device has a first flexible diaphragm that normally permits fluid communication through the device while preventing such fluid communication therethrough when a second flexible diaphragm of the device engages and moves the first diaphragm to a particular position thereof.

---

This invention relates to an improved pneumatic system as well as to improved parts for such a system or the like.

In particular, this invention provides a pneumatic system wherein a pneumatic source is adapted to be selectively interconnected to pneumatically operated actuator means by a programming means. However, it has been found that when the programming means is being rapidly advanced to a new position thereof by means which override the normal timer motor for driving the programming means, some means must be provided to prevent certain of the actuator means from being actuated by the rapidly moving program means.

According to the teachings of this invention, such an improved relay valve or lockout has been provided wherein a pneumatic signal directed to the valve means of this invention will prevent the interconnection of the pneumatic source to certain of the actuator means during the operation of the rapid advance means for the program means.

Accordingly, it is an object of this invention to provide an improved pneumatic system having one or more of the novel features set forth above or hereinafter shown or described.

Another object of this invention is to provide an improved part for such a pneumatic system or the like.

Other objects, uses and advantages of this invention are apparent from a reading of this description which proceeds with reference to the accompanying drawings forming a part thereof and wherein:

FIGURE 1 is a schematic view illustrating the improved pneumatic system of this invention.

FIGURE 2 is a fragmentary cross-sectional view illustrating the program means of this invention.

FIGURE 3 is a view similar to FIGURE 1 and illustrates the valve means in another operating position thereof.

While the various features of this invention are hereinafter described and illustrated as being particularly adaptable to provide a lockout valve means for a pneumatic system, it is to be understood that the various features of this invention can be utilized singly or in any combination thereof to provide valve means for other uses.

Therefore, this invention is not to be limited to only the embodiment illustrated in the drawings, because the drawings are merely utilized to illustrate one of the wide variety of uses of this invention.

Referring now to FIGURE 1, the improved pneumatic system of this invention is generally indicated by the reference numeral 10 and comprises a vacuum pump 11, a stationary reading head 12, vacuum operated actuator means 13, 14 and 15 and a lockout valve means 16.

The stationary reading head 12 has a reading surface 17 interrupted by a plurality of ports 18, 19, 20, 21, 22 and 23, it being understood that a greater or smaller number of ports can be provided in the reading head 12 if desired.

The program member, generally indicated by the reference numeral 24 in FIGURE 2, comprises a flexible tape-like member 25 having a plurality of open-ended blisters 26 formed therein and adapted to selectively bridge two or more ports in the reading head 12. In addition, the flexible reading tape 25 has a plurality of aperture means 27 passing therethrough adapted to be selectively aligned with the ports in the reading head 12 in a manner hereinafter described.

The reading member 25 is carried by a rigid backing member 28 and separated therefrom by a porous compressible means 29 whereby air can pass through a suitable aperture means 30 in the backing member 28 and be filtered by the porous material 29 before the same will flow through the aperture means 27 thereof for a purpose hereinafter described.

The program member 24 is normally adapted to be moved relative to the reading surface 17 of the reading head 12 by a suitable timer motor at a constant speed to selectively interconnect the vacuum source 11 to various vacuum operated actuator means by having the blister means 26 thereof interconnect together vacuum ports with actuator ports. Also, the reading member 24 returns a particular actuated vacuum operated actuator means to its normal atmospheric conditions when an aperture means 27 of the reading member 25 is aligned with a port in the reading head 12 leading to that particular actuator means.

However, it has been found that when the program member 24 is rapidly advanced relative to the reading head 12 by actuator means 15 in a manner to eliminate part of the program which would be normally be operated by the program member 24, it is desirable to prevent the program member 24 from interconnecting the vacuum source to certain of the actuators during this rapid advancement.

Therefore, the lockout valve means 16 of this invention is provided and will now be described.

The valve means 16 comprises a housing 30' having three ports 31, 32 and 33 therein. A first flexible diaphragm 34 is carried by the housing means 30' and cooperates therewith to define a first chamber 35 interconnected to the two ports 32 and 33. However, the housing 30' defines a valve seat 36 separating the ports 32 and 33 and is opened and closed by the first diaphragm 34.

A compression spring 37 is carried by the housing 30' and normally urges the diaphragm 34 to the position illustrated in FIGURE 1 to maintain communication between the ports 32 and 33 even if the vacuum source 11 is interconnected to the chamber 35 thereof.

The port 32 of the valve means 16 is interconnected by flexible conduit means 38 to the vacuum source 11 while the vacuum source 11 is interconnected to the port 19 of the reading head 12 by a branch conduit means 39.

The port 33 of the valve means 16 is interconnected to the port 22 of the reading head 12 by flexible conduit means 40.

The ports 21 and 23 of the reading head 12 are respectively interconnected to the vacuum operated actuator means 13 and 14 by flexible conduit means 41 and 42.

The port 18 in the reading head 12 is interconnected to the rapid advance actuator means 15 by a flexible conduit means 43, the flexible conduit means 43 also being interconnected to the port 31 of the valve means 16.

A second flexible diaphragm 44 is carried by the housing means 30' and cooperates therewith to define a second chamber 45 interconnected to the port 31, the second flexible diaphragm 44 being substantially larger than the first flexible diaphragm 34 for a purpose hereinafter described.

The operation of the pneumatic system 10 of this invention will now be described.

When the program member 24 is being moved relative to the reading head 12 by the conventional timer motor for moving the same, various blisters 26 thereof alternately or simultaneously can interconnect the port 22 with the ports 21 and 23 whereby it can be seen that the vacuum source 11 will be interconnected to the actuator means 13 and 14 through the valve member 16 because the spring means 37 maintains the first flexible diaphragm 34 away from the valve seat 36 as long as atmospheric conditions exist in the chamber 45.

However, when a blister means 26 of the program member 24 bridges the ports 18 and 19, it can be seen that the vacuum source 11 will be interconnected to the actuator 15 which will rapidly move the program member 24 relative to the reading head 12 in an overriding direction whereby it is desired that the actuators 13 and 14 not be actuated during this rapid movement of the program member 24.

Since the vacuum source 11 is now interconnected to the port 18 in the reading head 12, the vacuum source 11 is interconnected by the flexible conduit means 43 to the port 31 of the valve means 16 and, thus, to the chamber 45 whereby the vacuum in the chamber 45 pulls the flexible diaphragm 44 to the left and, because the diaphragm 44 is substantially larger than the diaphragm 34, the same will move the first diaphragm 34 also to the left in opposition to the force of the compression spring 37 to close the valve seat 36 in the manner illustrated in FIGURE 3.

When the diaphragm 34 closes the valve seat 36, it can be seen that the vacuum source 11 is no longer interconnected to the port 22 so that even though blister means 26 are interconnecting the port 22 to the ports 21 and 23, the actuator means 13 and 14 will not be operated as long as the vacuum source 11 is interconnected to the chamber 45 and is operating the rapid advance actuating means 15.

When blister means 26 cease to interconnect together the ports 18 and 19, and a suitable aperture means 27 of the program member 24 is aligned with the port 18, the actuator means 15 returns to normal atmospheric conditions as well as the chamber 45 of the valve means 16 whereby the diaphragm 44 moves out to the position illustrated in FIGURE 1 so that the spring means 27 can again move the flexible diaphragm 34 away from the valve seat 36 to permit the vacuum source 11 to be interconnected to the port 22 of the reading head 12 for the purpose previously described.

Therefore, it can be seen that not only has an improved pneumatic system been provided by this invention, but also an improved valve means for such a system has been provided.

While the form of the invention now preferred has been disclosed as required by the statutes, other forms may be used, all coming within the scope of the claims which follow:

What is claimed is:

1. In combination, a housing means having two ports therein, a first flexible diaphragm carried by said housing means and when in one position permitting communication between said ports and when in another position preventing communication between said ports, and a second flexible diaphragm carried by said housing means, said second diaphragm when in one position thereof being spaced from said first diaphragm and permitting said first diaphragm to move to said one position thereof and when moved to another position thereof directly engaging said first diaphragm and holding said first diaphragm in said other position thereof.

2. A combination as set forth in claim 1 wherein spring means is carried by said housing and tends to maintain said first diaphragm in said one position thereof.

3. A combination as set forth in claim 1 wherein said second diaphragm is larger than said first diaphragm.

4. In combination, a housing means having two ports therein, a first flexible diaphragm carried by said housing means and when in one position permitting communication between said ports and when in another position preventing communication between said ports, a pneumatic source operatively interconnected to one of said ports, pneumatically operated actuator means operatively interconnected to the other of said ports, and a second flexible diaphragm carried by said housing means, said second diaphragm when in one position thereof being spaced from said first diaphragm and permitting said first diaphragm to move to said one position thereof and when moved to another position thereof directly engaging said first diaphragm and holding said first diaphragm in said other position thereof.

5. A combination as set forth in claim 4 wherein a programming means selectively interconnects said other port to said actuator means.

6. A combination as set forth in claim 4 wherein spring means is carried by said housing and tends to maintain said first diaphragm in said one position thereof.

7. In combination, a housing means having three ports therein, a first flexible diaphragm carried by said housing means and defining a first chamber therewith interconnected to two of said ports, and a second flexible diaphragm carried by said housing means and defining a second chamber therewith interconnected to the remaining port, said first diaphragm permitting fluid communication between said two ports when a pneumatic signal is directed to one of said two ports and said first diaphragm is in one position thereof, said second diaphragm closing off communication between said two ports when a pneumatic signal is directed to said remaining port even when said pneumatic signal is being directed to said one of said two ports by directly moving against said first diaphragm and moving the same to another position thereof.

8. A combination as set forth in claim 7 wherein a spring means is carried by said housing and tends to maintain said first diaphragm in its port communicating position.

9. A combination as set forth in claim 7 wherein said second diaphragm is larger than said first diaphragm.

10. In combination, a housing means having three ports therein, a first flexible diaphragm carried by said housing means and defining a first chamber therewith interconnected to two of said ports, a pneumatic source operatively interconnected to one of said two ports, pneumatically operated actuator means operatively interconnected to the other of said two ports, a second flexible diaphragm carried by said housing means and defining a second chamber therewith interconnected to the remaining port, and means for interconnecting said source to said remaining port, said first diaphragm permitting fluid communication between said two ports when said source is not interconnected to said remaining port and said first diaphragm is in one position thereof, said second diaphragm closing off communication between said two ports when said source is interconnected to said remaining port by directly moving against said first diaphragm and moving the same to another position thereof.

11. A combination as set forth in claim 10 wherein a programming means selectively interconnects said other port of said two ports to said actuator means.

12. A combination as set forth in claim 10 wherein a programming means selectively interconnects said source to said remaining port.

13. A combination as set forth in claim 12 wherein said remaining port is also in fluid communication with other pneumatically operated actuator means.

14. In combination, a housing means having three ports therein, a first flexible diaphragm carried by said housing means and defining a first chamber therewith interconnected to two of said ports, said housing means having a valve seat separating said two ports and being opened and closed by said first diaphragm, spring means carried by said housing means and tending to maintain said first diaphragm away from said valve seat even when a vacuum source is interconnected to one of said two ports, and a second flexible diaphragm carried by said housing means and defining a second chamber therewith interconnected to the remaining port, said second diaphragm directly engaging and moving said first diaphragm to close said valve seat when a vacuum source is interconnected to said remaining port even when said vacuum source is interconnected to said one port of said two ports.

15. A combination as set forth in claim 14 wherein said second diaphragm is larger than said first diaphragm.

16. A combination as set forth in claim 14 wherein said first diaphragm defines part of said second chamber.

17. In combination, a housing means having three ports therein, a first flexible diaphragm carried by said housing means and defining a first chamber therewith interconnected to two of said ports, said housing means having a valve seat separating said two ports and being opened and closed by said first diaphragm, spring means carried by said housing means and tending to maintain said first diaphragm away from said valve seat even when a vacuum source is interconnected to one of said two ports, a vacuum source operatively interconnected to said one port of said two ports, vacuum operated actuator means operatively interconnected to the other of said two ports, a second flexible diaphragm carried by said housing means and defining a second chamber therewith interconnected to the remaining port, and means for selectively interconnecting said source to said remaining port, said second diaphragm directly engaging and moving said first diaphragm to close said valve seat when said source is interconnected to said remaining port.

18. A combination as set forth in claim 17 wherein a programming means selectively interconnects said other port of said two ports to said actuator means.

19. A combination as set forth in claim 17 wherein a programming means selectively interconnects said source to said remaining port.

20. A combination as set forth in claim 19 wherein said remaining port is also in fluid communication with other vacuum operated actuator means.

References Cited

UNITED STATES PATENTS

| | | | |
|---|---|---|---|
| 387,851 | 8/1888 | Braggins | 251—61 X |
| 1,053,315 | 2/1913 | O'Dowd | 251—61 X |
| 1,327,675 | 1/1920 | Hornung | 251—61 X |
| 1,542,517 | 6/1925 | Partlow | 251—61 X |
| 1,722,666 | 7/1929 | Keith | 251—61 X |
| 2,065,199 | 12/1936 | Sexton | 251—61 X |
| 2,273,679 | 2/1942 | Westberg | 251—61 X |
| 2,572,175 | 10/1951 | McPherson | 251—61 X |
| 2,868,225 | 1/1959 | Wigham et al. | 251—331 X |
| 3,199,412 | 8/1965 | Palmer | 251—331 X |
| 3,252,481 | 5/1966 | Meier | 251—331 X |

FOREIGN PATENTS 471,763   2/1951   Canada.

MARTIN P. SCHWADRON, *Primary Examiner.*

ROBERT R. BUNEVICH, *Examiner.*